United States Patent
Dorn et al.

(10) Patent No.: US 8,390,968 B2
(45) Date of Patent: Mar. 5, 2013

(54) APPARATUS FOR PROTECTION OF CONVERTER MODULES

(75) Inventors: Jörg Dorn, Buttenheim (DE); Werner Hartmann, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 265 days.

(21) Appl. No.: 12/596,159

(22) PCT Filed: Apr. 2, 2008

(86) PCT No.: PCT/EP2008/053925
§ 371 (c)(1),
(2), (4) Date: Oct. 29, 2009

(87) PCT Pub. No.: WO2008/125494
PCT Pub. Date: Oct. 23, 2008

(65) Prior Publication Data
US 2010/0118453 A1  May 13, 2010

(30) Foreign Application Priority Data
Apr. 16, 2007  (DE) .......................... 10 2007 018 344

(51) Int. Cl.
*H02H 3/22* (2006.01)
*H02H 9/06* (2006.01)

(52) U.S. Cl. ............... 361/54; 361/111; 361/120; 361/8
(58) Field of Classification Search .................... 361/54, 361/111, 120, 8
See application file for complete search history.

(56) References Cited

U.S. PATENT DOCUMENTS

| | | | | |
|---|---|---|---|---|
| 3,538,382 A | * | 11/1970 | Smith, Jr. | 361/56 |
| 4,421,961 A | * | 12/1983 | Sakuma et al. | 218/119 |
| 4,953,068 A | * | 8/1990 | Henze | 363/17 |
| 6,009,615 A | * | 1/2000 | McKean et al. | 29/602.1 |
| 6,546,287 B1 | * | 4/2003 | Havel et al. | 607/7 |
| 6,657,150 B1 | | 12/2003 | Shea et al. | |
| 6,753,493 B2 | * | 6/2004 | Rhein et al. | 218/120 |
| 7,016,209 B2 | * | 3/2006 | Li et al. | 363/133 |
| 7,053,327 B2 | * | 5/2006 | Benke et al. | 218/154 |
| 7,679,022 B2 | * | 3/2010 | Tsuchiya et al. | 218/120 |
| 2007/0000876 A1 | | 1/2007 | Morita et al. | |
| 2008/0232145 A1 | | 9/2008 | Hiller et al. | |
| 2008/0309437 A1 | * | 12/2008 | Smith et al. | 335/18 |

FOREIGN PATENT DOCUMENTS

| | | |
|---|---|---|
| CN | 1148255 A | 4/1997 |
| CN | 1381855 A | 11/2002 |
| CN | 1672228 A | 9/2005 |
| DE | 19921173 A1 | 11/2000 |
| DE | 102005040543 A1 | 3/2007 |
| JP | 2002033034 A | 1/2002 |
| JP | 2002093291 A | 3/2002 |
| JP | 2006059557 A | 3/2006 |
| RU | 2260868 C2 | 9/2005 |
| SU | 1700633 A1 | 12/1991 |
| WO | 2007023064 A1 | 3/2007 |

* cited by examiner

*Primary Examiner* — Rexford Barnie
*Assistant Examiner* — Zeev V Kitov
(74) *Attorney, Agent, or Firm* — Laurence A. Greenberg; Werner H. Stemer; Ralph E. Locher

(57) ABSTRACT

A device (1) has a series circuit of submodules with a power semiconductor circuit and an energy accumulator connected in parallel with the power semiconductor circuit. Each submodule is associated with a short circuit device for shorting the submodule. The short circuit device is a vacuum switching tube. The device is cost-effective and at the same time enables safe bridging of a defective submodule.

7 Claims, 5 Drawing Sheets

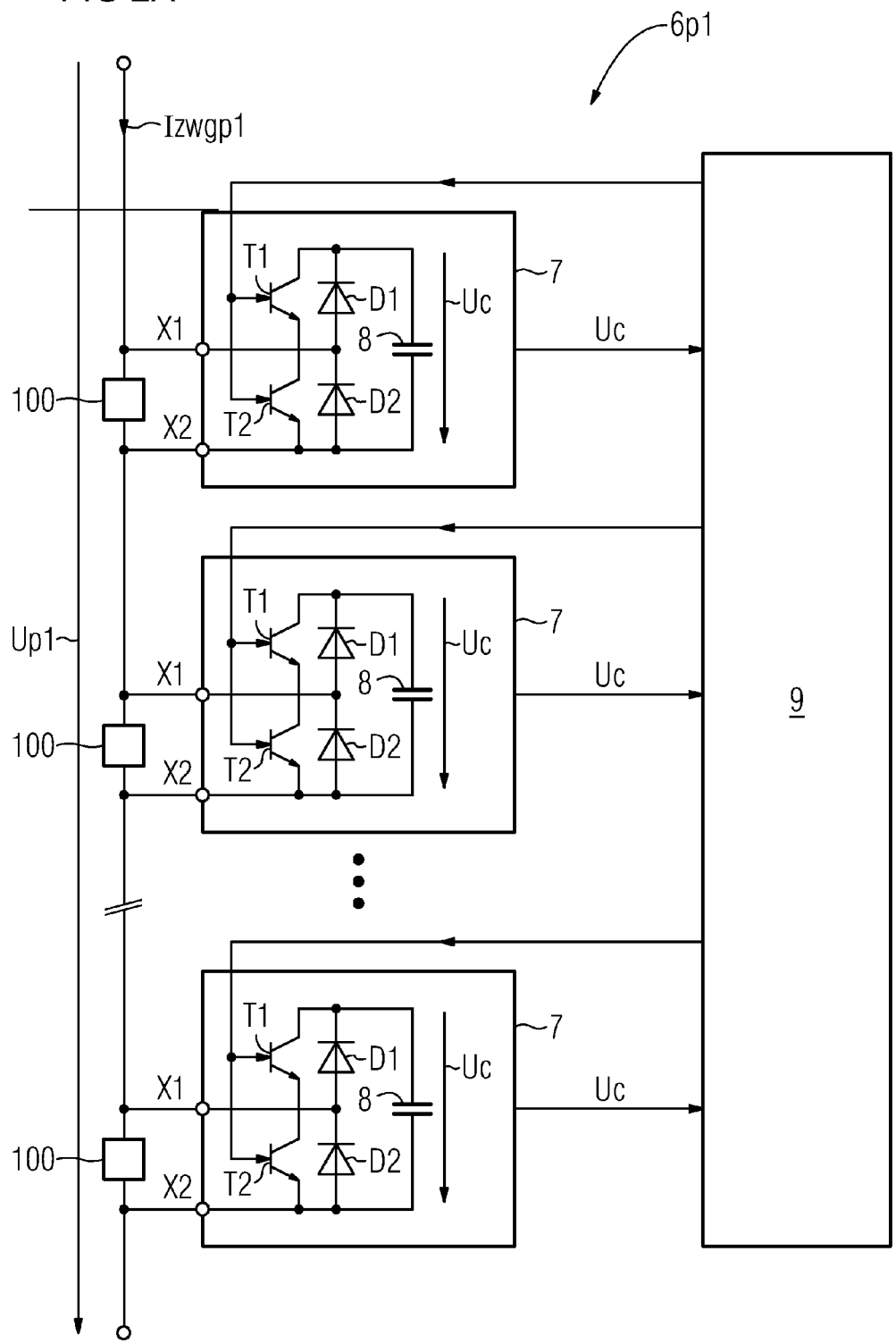

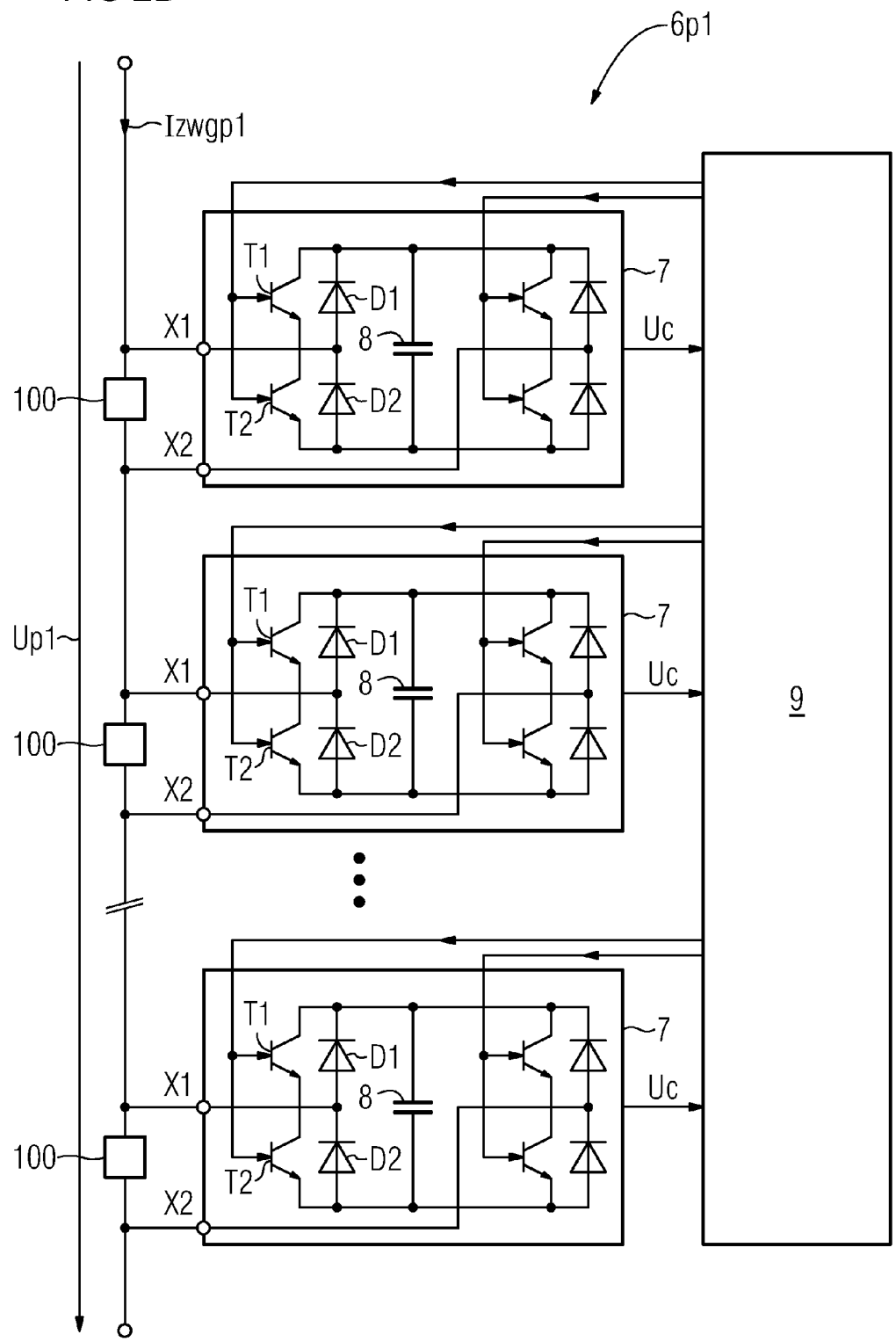

APPARATUS FOR PROTECTION OF CONVERTER MODULES

BACKGROUND OF THE INVENTION

Field of the Invention

The invention relates to an apparatus having a series circuit of submodules, which have a power semiconductor circuit and an energy store connected in parallel with the power semiconductor circuit, wherein each submodule has an associated short-circuiting device for short-circuiting the submodule.

In the case of voltage intermediate converters connected in series, and in particular in the case of converters for high-voltage, direct-current transmission for power distribution and transmission, power semiconductors which can be switched off are used in order to convert AC voltage to DC voltage, and vice versa. The voltage level in this case extends from several 10 kV up to several 100 kV. In order to achieve an appropriately high voltage, a large number of semiconductor modules, fitted with power semiconductor chips, must be connected in series because of the limited withstand voltage of the power semiconductors. Different semiconductor modules can also be connected to one another, forming a power semiconductor circuit. Particularly in the case of so-called multilevel converters, power semiconductor circuits such as these are part of a submodule which has two poles, wherein the submodules are connected in series. During continuous operation, it is possible for one of these semiconductor modules or the entire submodule to fail dielectrically, and to form an internal short-circuit. In order to prevent failure of the entire installation in the event of failure of a single semiconductor module or of one submodule, the faulty semiconductor module or submodule is bridged. A short-circuiting device is used for this purpose. This short-circuiting device must have a withstand voltage matching the level of the operating voltage of a semiconductor module throughout the life of the installation, and must also be able to withstand overvoltages which occur occasionally during operation. The current-carrying capacity of the short-circuiting device must be designed for the maximum mean operating current which can be drawn by the submodule. This is typically 100 A to about 1000 A.

From the prior art, particularly for high-voltage, direct-current converters, power semiconductors are generally used in the form of so-called press-packs, in which an internal short-circuit of one semiconductor component leads to a low-impedance short-circuit with only a small amount of heat being developed. The faulty semiconductor module in other words breaks down, as a result of which no further protection in the form of a short-circuiting device is required.

When using lower-cost bonded power semiconductors of modular design, an internal failure of a semiconductor module leads to the formation of an arc, which must be disconnected within a short time of typically about 1 ms in order to prevent further damage and the initiation of fire.

The apparatus of this generic type is already known from DE 103 23 220 A1. This document describes a converter which is intended for connection to an AC voltage line having a plurality of phases. The converter has phase modules which have a central AC voltage connection and two outer AC voltage connections. A phase module branch extends between the central AC voltage connection and each outer AC voltage connection, with each phase module branch comprising a series circuit of submodules. Each submodule has its own capacitor, in parallel with which a power semiconductor circuit is connected. The power semiconductor circuit has power semiconductors which can be switched off, each of which is connected back-to-back in parallel with a freewheeling diode. Each power semiconductor which can be switched off and the freewheeling diode respectively associated with it are combined to form a semiconductor module. A plurality of semiconductor modules are connected to one another and form a so-called full-bridge circuit, as a result of which either the voltage which is dropped across the capacitor, a zero voltage or the inverted capacitor voltage is dropped between the two connecting terminals of the respective submodule. A converter such as this is also referred to as a multilevel converter. The power semiconductors in a semiconductor module are not connected to one another by a through-contact. In fact, these are lower-cost bonded semiconductor modules, as a result of which a short-circuit within the semiconductor module or submodule can lead to the occurrence of an arc, with explosive gases and the like in consequence. In order to remove the driving voltage from the arc, the faulty submodule is short-circuited, and is in this way bridged in the series circuit. For short-circuiting, a short-circuiting device is connected in parallel with the submodule, comprising a sacrificial component composed of semiconductors or else a thyristor. The sacrificial component breaks down in the event of a fault, being destroyed in the process. In the event of a fault, the thyristor is triggered and carries a considerable proportion of the short-circuit current. The already known apparatus is, however, costly, because of the power semiconductors that are additionally used.

An apparatus for short-circuiting of submodules is known from PCT/DE2006/000344, which has not yet been published, wherein the apparatus has a short-circuiting device which is a pyrotechnic/mechanical element. In the event of a short-circuit, the pyrotechnic/mechanical element is triggered, for example with the explosive charge explosively accelerating a switching pin, in such a way that the faulty submodule is bridged.

BRIEF SUMMARY OF THE INVENTION

The object of the invention is to provide an apparatus of the type mentioned initially, which costs little and at the same time allows reliable bridging of a faulty submodule.

The invention achieves this object by the short-circuiting device being a vacuum interrupter tube.

According to the invention, and in contrast to the prior art, no semiconductor or air gap path is used, but a vacuum interrupter tube. Vacuum interrupter tubes such as these are manufactured in large quantities and are therefore commercially available at low cost. Commercially available vacuum interrupter tubes for low voltage in particular have the required electrical parameters and are also suitable as short-circuiting devices for the submodules of a converter, because of their physical size.

Vacuum interrupter paths have a particularly high dielectric isolation capability, as a result of which the switching path between the contacts of the vacuum interrupter tube can be kept very short. This means the accelerating forces to move the vacuum interrupter tube from a disconnected position to a contact position can also likewise be small.

A tripping and latching unit is advantageously provided for latching the vacuum interrupter tube in a disconnected position and for removing the latch. The tripping and latching unit holds a moving contact, which is guided such that it can move, of the vacuum interrupter tube in a disconnected position, in which a current flow through the vacuum interrupter tube is interrupted.

In contrast, when this tripping and latching unit trips, the vacuum interrupter tube is moved to its contact position, in which it bridges the submodule.

A closing spring is expediently provided, which is stressed in the disconnected position of the vacuum interrupter tube, as a result of which release of the latch results in the spring force of the closing spring being released, for moving the vacuum interrupter tube to its contact position.

The tripping and latching unit advantageously has a permanent magnet, which produces a latching force, and a tripping means, which counteracts the holding force during release of the latch.

The tripping means is advantageously an electrical coil. Current is passed through the electrical coil, in order to close the vacuum interrupter tube. The current flow through the electrical coil results in a magnetic field which opposes the magnetic field of the permanent magnet. In other words, the current flow through the electrical coil weakens a holding force of the permanent magnet, as a result of which the vacuum interrupter tube is moved to its contact position, because of the closing forces.

According to one further development which is expedient in this context, the tripping and latching unit has a magnetic yoke and an armature which is guided such that it can move, wherein the yoke is connected to the permanent magnet, and the armature closes a magnetic circuit in the disconnected position. The yoke, the permanent magnet and the armature form a magnetic circuit in the latching point. In this case, the armature bridges an air gap and rests firmly on the yoke or on the permanent magnet. In this position, the magnetic field of the permanent magnet propagates in the yoke, which is advantageously made of soft-magnetic material, and the armature which moves with respect thereto. The closing of the magnetic circuit in the disconnected position results in the magnetic circuit being closed and produces a better energetic state in comparison to a magnetic circuit which has air gaps, thus ensuring magnetic locking of the armature. In this case, the armature is expediently connected to a moving contact of the vacuum interrupter tube, directly or via an expedient lever mechanism. A movement of the armature is thus introduced directly into the moving contact of the vacuum interrupter tube.

According to one further development, which is expedient in this context, the electrical coil is designed to weaken the magnetic force of the permanent magnet in the magnetic circuit. If the magnetic force of the permanent magnet is weakened, the forces which oppose the magnetic force and are directed in order to move the moving contact to the contact position, are stronger than the magnetic force. This therefore results in the vacuum interrupter tube being closed, and thus in the submodule being short-circuited.

The power semiconductor circuit is expediently a full-bridge circuit. By way of example, four power semiconductors which can be switched off are used in this case, for example IGBTs, GTOs or IGCTs. A freewheeling diode is connected back-to-back in parallel with each of these power semiconductors which can be switched off. Each submodule is in the form of a two-pole network. In the case of a full-bridge circuit, as already described in conjunction with the prior art, either the voltage which is dropped across the energy store, a zero voltage or the inverted energy store voltage can be produced between the connecting terminals of each submodule.

In contrast to this, the power semiconductor circuit is a half-bridge circuit. Half-bridge circuits such as these have only two power semiconductors which can be switched off, each of which once again has a freewheeling diode connected back-to-back in parallel with it. A half-bridge circuit, which, for example, has also become known as a Marquardt circuit, allows either the voltage which is dropped in the energy store of the submodule or else a zero voltage to be produced between the two connecting terminals of each submodule.

The apparatus is advantageously a converter which has an AC voltage connection for connection of an AC voltage power supply system. Possible applications of apparatuses such as these lie in the field of so-called "Flexible AC Transmission Systems", or FACTS for short, or in the field of high-voltage, direct-current transmission HVDCT.

The vacuum interrupter tube is expediently designed such that it can be moved without a drive from the disconnected position to a contact position, in which the submodule is short-circuited, when the latch is removed. According to this advantageous further development, the vacuum interrupter tube is moved from its disconnected position to the contact position essentially on its own as a result of the pressure difference which occurs between the interior of the vacuum interrupter tube and the external atmosphere. A current can flow via the vacuum interrupter tube in the contact position while, in contrast, a current flow via the vacuum interrupter tube is interrupted in the disconnected position. The stressing force of a bellows which is connected to the moving contact generally occurs as well in addition to the force which results from said pressure difference. In commercially available vacuum interrupter tubes, the pressure in the interior of the vacuum interrupter tube is about $10^{-6}$ Pa. According to one further development in this context, a small auxiliary spring is provided, which produces an additional auxiliary force to close the contact.

In certain cases, it is advantageous to provide a drive unit. The drive unit allows deliberate switching of the vacuum interrupter tube.

Further expedient refinements and advantages of the invention are the subject matter of the following description of exemplary embodiments of the invention with reference to the figures in the drawing, in which the same reference symbols refer to components having the same effect, and in which:

BRIEF DESCRIPTION OF THE SEVERAL VIEWS OF THE DRAWING

FIG. 2A shows a phase module branch with a series circuit of submodules, FIG. 2B shows the power semiconductor circuit as a full-bridge circuit.

DESCRIPTION OF THE INVENTION

Figure 1:
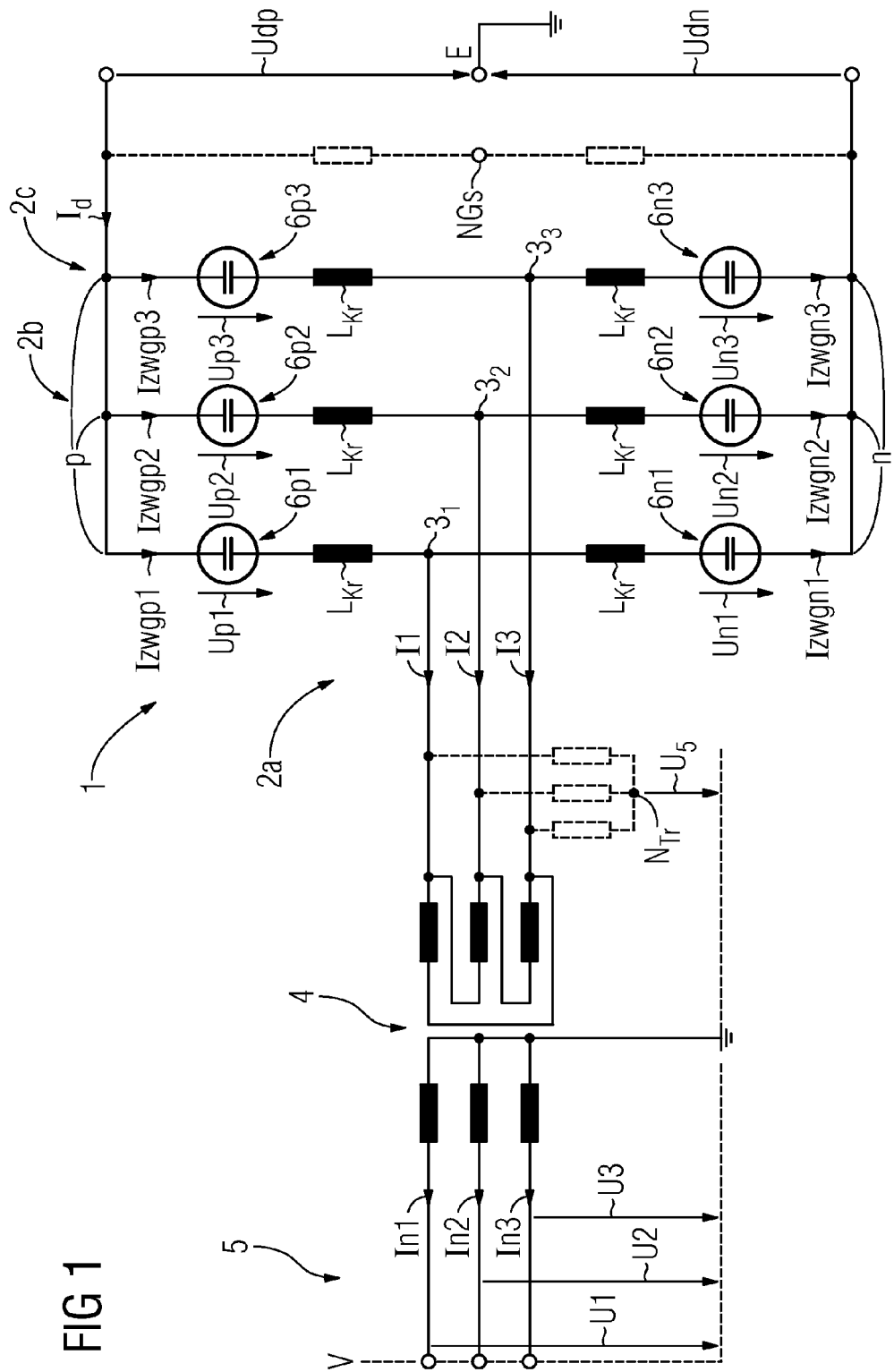
FIG. 1 shows one exemplary embodiment of the apparatus according to the invention.

FIG. 1 shows one exemplary embodiment of the apparatus 1 according to the invention, which is formed from three phase modules 2a, 2b and 2c. Each phase module 2a, 2b and 2c is connected to a positive DC voltage line p and to a negative DC voltage line n, as a result of which each phase module 2a, 2b, 2c has two DC voltage connections p and n.

Furthermore, a respective AC voltage connection $3_1$, $3_2$ and $3_3$ is provided for each phase module 2a, 2b and 2c. The AC voltage connections $3_1$, $3_2$ and $3_3$ are connected via a transformer 4 to a three-phase AC voltage power supply system 5. The phase voltages between the phases of the AC voltage power supply system 5 are U1, U2 and U3, with the power supply system currents that flow being In1, In2 and In3. The phase current on the AC voltage side of each phase module is annotated I1, I2 and I3. The DC voltage current is $I_d$. Phase module branches 6p1, 6p2 and 6p3 extend between each of the AC voltage connections $3_1$, $3_2$ or $3_3$ and the positive DC voltage line p. The phase module branches 6n1, 6n2 and 6n3 are formed between each AC voltage connection $3_2$, $3_2$, $3_3$ and the negative DC voltage line n. Each phase module branch 6p1, 6p2, 6p3, 6n1, 6n2 and 6n3 comprises a series circuit of submodules, although these are not illustrated in detail in FIG. 1, and an inductance, which is annotated $L_{Kr}$ in FIG. 1.

FIG. 2 shows the series circuit of the submodules 7 and in particular the design of the submodules in more detail by means of an electrical equivalent circuit, with only the phase module branch 6p1 having been picked out in FIG. 2. The remaining phase module branches are, however, of identical design. As can be seen, each submodule 7 has two series-connected power semiconductors T1 and T2 which can be switched off. By way of example, power semiconductors which can be switched off are so-called IGBTs, GTOs, IGCTs or the like. These are known per se to a person skilled in the art, and they therefore do not need to be described in detail at this point. Each power semiconductor T1, T2 which can be switched off has a freewheeling diode D1, D2 connected back-to-back in parallel with it. A capacitor 8 is connected as an energy store in parallel with the series circuit formed by the power semiconductors T1, T2 which can be switched off, and the freewheeling diodes D1 and D2. Each capacitor 8 is charged on a unipolar basis. Two voltage states can now be produced between the connecting terminals X1 and X2 of each submodule 7. If, for example, a drive unit 9 produces a drive signal by means of which the power semiconductor T2 which can be switched off is changed to its on position, in which current can flow via the power semiconductor T2, the voltage drop between the terminals X1, X2 of the submodule 7 is zero. In this case, the power semiconductor T1 which can be switched off is in its blocking position, in which a current flow via the power semiconductor T1 which can be switched off is interrupted. This prevents the discharging of the capacitor 8. If, in contrast, the power semiconductor T1 which can be switched off is in its on position, but the power semiconductor T2 which can be switched off has been changed to its blocking position, the full capacitor voltage Uc is produced between the terminals X1, X2 of the submodule 7.

The exemplary embodiment of the apparatus according to the invention as shown in FIGS. 1 and 2 is also referred to as a so-called multilevel converter. By way of example, a multilevel converter such as this is suitable for use as a drive for electrical machines, such as motors or the like. Furthermore, a multilevel converter such as this is also suitable for use in the field of power distribution and transmission. The apparatus according to the invention is therefore used, for example, as a back-to-back link, which comprises two converters which are connected to one another on the DC voltage side, with the converters each being connected to an AC voltage power supply system. Back-to-back links such as these are used to exchange energy between two power distribution systems, for example with the power distribution systems having a different frequency, phase angle, star-point treatment or the like. Furthermore, applications may be considered in the field of power factor correction, as so-called FACTS (Flexible AC Transmission Systems). Multilevel converters such as these can also be used for high-voltage, direct-current transmission over long distances. Because of the wide range of different application options, there are a large number of different operating voltages to which the respective apparatus according to the invention can be matched. For this reason, the number of submodules may vary from a few up to several hundred submodules 7.

As has already been stated further above, it is advantageous for a faulty submodule to be short-circuited within a few milliseconds after the occurrence of the fault. Any arc which occurs in the event of a fault is then quenched before greater damage can occur. In order to short-circuit the submodules, a vacuum interrupter tube 100 is connected as a short-circuiting device between the connecting terminals X1 and X2 of each submodule 7. During normal operation, the only schematically illustrated vacuum interrupter tube 100 is in its disconnected position, thus avoiding any short-circuit between the connecting terminals X1 and X2 of the associated submodule 7.

Figure 3:
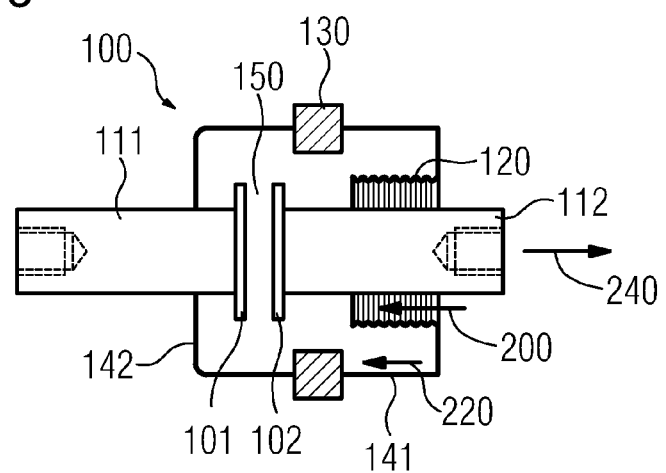
FIG. 3 shows one exemplary embodiment of a vacuum interrupter tube in the form of a sectioned side view.

FIG. 3 shows a sectioned side view of the vacuum interrupter tube 100. The vacuum interrupter tube 100 has a vacuum-tight housing which is formed by a first metallic housing part 141, a second metallic housing part 142, and an annular ceramic insulator as well as a metal bellows. The internal pressure in the interior of the vacuum interrupter tube 100, which is bounded by said components, is about $10^{-6}$ Pa. In other words, there is a vacuum in the interior of the vacuum interrupter tube 100.

A fixed contact bolt 111 passes through the second metallic housing part 142 and is fitted with a fixed contact 101 at its free end, which is arranged in the interior of the vacuum interrupter tube 100. The fixed contact 101 has an associated moving contact 102, which is located opposite the former in a longitudinal direction, and is firmly connected to a moving contact bolt 112. The moving contact bolt 112 is guided such that it can move longitudinally with respect to the fixed contact 101, although the moving contact bolt 112 is connected in a vacuum-tight manner to the metal bellows 120. At its end remote from the moving contact bolt 112, the metal bellows 120 is attached in a vacuum-tight manner to the first metallic housing part 141. The fixed contact bolt 101 has an internal thread, which is indicated in FIG. 3 and is used for electrical connection of the first connecting terminal of an associated submodule. In a corresponding manner, the moving contact bolt 112 also has an internal thread for conductive attachment of the second connecting terminal of the submodule.

FIG. 3 shows the vacuum interrupter tube 100 in its disconnected position, in which the moving contact 102 is separated from the fixed contact 101 by a contact gap 150. In this case, the vacuum that is present has a high electrical isolation capability, as a result of which even the small contact gap 150 that is shown is sufficient to provide the necessary withstand voltage for the vacuum interrupter tube 100 in the disconnected position, when a high voltage is applied.

Because of the high pressure difference between the interior of the vacuum interrupter tube 100 and the external atmosphere, a force effect 200 occurs, which acts in the longitudinal direction of the moving contact bolt 112 and forces the moving contact 102 against the fixed contact 101. The force effect 200 is assisted by the spring force of the metal bellows 120, which is prestressed in the illustrated disconnected position, and likewise forces the moving contact 102 in the direction of the fixed contact 101. A holding force 240 is therefore required in order to move the vacuum interrupter tube 100 to its disconnected position, which holding force 240 counteracts the closing force resulting from said pressure difference and resulting from the prestressing of the metal bellows.

Figure 4:
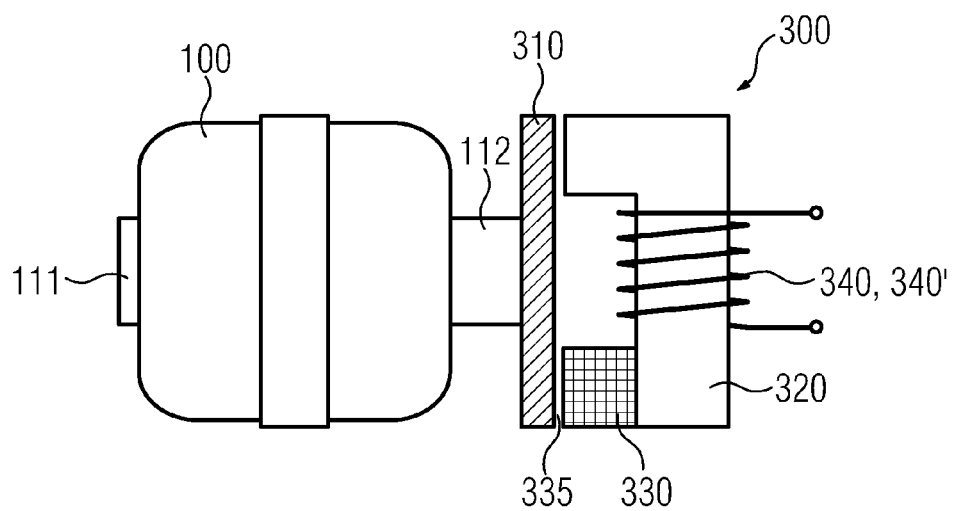
FIG. 4 shows the vacuum interrupter tube as shown in FIG. 3, with a tripping and latching unit.

FIG. 4 shows the vacuum interrupter tube 100 with its fixed contact bolt 111 and its moving contact bolt 112, with the moving contact bolt 112 being firmly connected to an armature 310 of a tripping and latching unit 300. The tripping and latching unit 300 comprises a permanent magnet 330, a soft-magnetic yoke 320 which is connected to the permanent magnet 330, said armature 310 and an electrical coil 340. The magnetic field which is produced by the permanent magnet 330 tries to propagate in a material whose magnetic reluctance is as low as possible. The magnetic reluctance of the armature 310 and of the yoke 320 is less than that of air. In order to achieve as low an energetic state as possible, the armature 310 therefore tries to close the air gap 335 which can be seen between the yoke 320 and/or the permanent magnet 330 and the armature 310. In other words, the moving contact bolt 112 and therefore the moving contact 102 are held in the disconnected position by the force of the permanent magnet 330. Passing current in an expedient manner through the electrical coil 340 results in the force of the permanent magnet 330 being weakened until, in the end, the closing force is greater than the holding force of the permanent magnet 330, as a result of which the armature 310 is torn off the soft-magnetic yoke 320 and off the permanent magnet 330. In the process, the vacuum interrupter tube 100 is moved to its contact position, in which current can flow via the vacuum interrupter tube 100. Passing current through the electrical coil 340 therefore allows the vacuum interrupter tube 100 to be switched on, thus allowing an associated submodule to be bridged.

Figure 5:
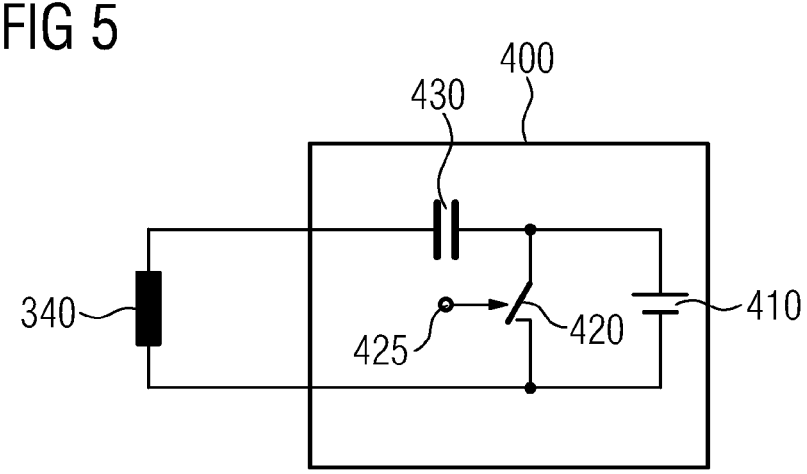
FIG. 5 shows an electronic drive for driving the coil of the tripping and latching unit shown in FIG. 4.

FIG. 5 shows an electronic drive 400 for the electrical coil 340 shown in FIG. 4. The electronic drive 400 comprises a power supply unit 410, an electronically drivable closing switch 420, a connection for tripping the closing switch 420, and an energy store 430. By way of example, the closing switch 420 is a power semiconductor which can be driven, for example a thyristor or IGBT. When the closing switch 420 is closed or is moved to its on position, the energy store 430 is discharged, resulting in a short-circuit current flowing through the electrical coil 340. The short-circuit current causes the electrical coil 340 to produce a sufficiently high magnetic field that the armature 30 is torn off the magnetic yoke.

Figure 6:
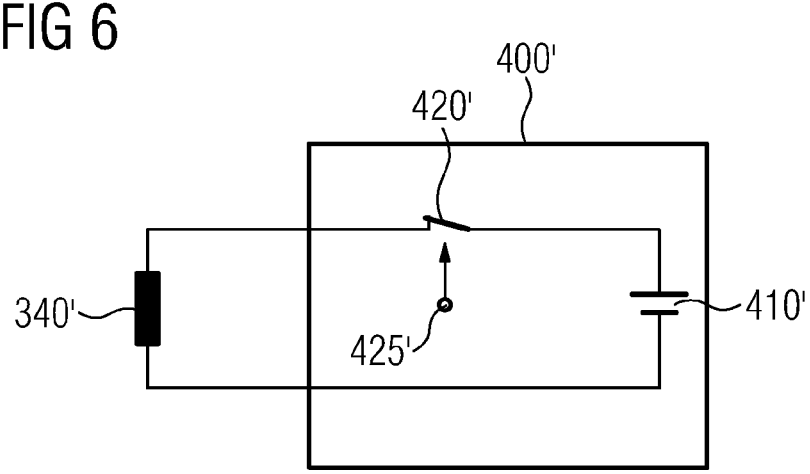
FIG. 6 shows a further exemplary embodiment of an electronic drive for the electrical coil shown in FIG. 4.

FIG. 6 shows a different exemplary embodiment of the tripping and locking unit 300, in which the tripping and locking unit 300 as shown in FIG. 6 has no permanent magnets. Instead of this, the holding force which is required to hold the moving contact bolt is produced solely by the magnetic force of the coil. The coil is therefore energized during normal operation. However, in order to bridge the submodule 7, the switch 420 is switched to its disconnected position, thus preventing any current flow through the electrical coil 340. The holding force is therefore lost, thus leading to the armature being torn off and therefore to closing of the vacuum interrupter tube 100, as a result of the closing force as described above.

The invention claimed is:

1. A circuit configuration, comprising:
a series circuit of a plurality of submodules each having a power semiconductor circuit and an energy storage device connected in parallel with said power semiconductor circuit;
each said submodule having a vacuum interrupter tube associated therewith, said vacuum interrupter tube forming a short-circuiting device for short-circuiting the respective said submodule;
a tripping and latching unit for latching said vacuum interrupter tube in a disconnected position with a latch and for removing said latch; and
said vacuum interrupter tube being configured to be moved, without a drive, from a disconnected position into a connected position, in which the respective said submodule is short-circuited, when said latch is removed, whereupon said vacuum interrupter tube is moved from the disconnected position into the connected position substantially only as a result of a pressure difference between an interior of said vacuum interrupter tube and an exterior atmosphere.

2. The circuit configuration according to claim 1, wherein said tripping and latching unit has a permanent magnet configured to produce a latching force, and a tripping means configured to counteract a holding force in order to release said latch.

3. The circuit configuration according to claim 2, wherein the tripping means is an electrical coil.

4. The circuit configuration according to claim 1, wherein said power semiconductor circuit is a full-bridge circuit.

5. The circuit configuration according to claim 1, wherein said power semiconductor circuit is a half-bridge circuit.

6. The circuit configuration according to claim 1 configured as a converter with an AC voltage connection for connection of an AC voltage power supply system.

7. A circuit configuration, comprising:
a multiplicity of submodules connected in series with one another, each of said submodules having a power semiconductor circuit and an energy storage device connected in parallel with said power semiconductor circuit;
a multiplicity of vacuum interrupter tubes each connected in parallel with a respective said submodule and each forming a short-circuiting device for short-circuiting the respective said submodule;
each said vacuum interrupter tube being movable from a disconnected position, in which the respective said submodule is active, into a connected position in which the respective said submodule is bypassed;
a tripping and latching unit for latching each said vacuum interrupter tube in a disconnected position with a latch and for removing said latch; and
wherein, when said latch is removed, said vacuum interrupter tube is moved from the disconnected position into the connected position substantially only as a result of a pressure difference between an interior of said vacuum interrupter tube and an exterior atmosphere.

* * * * *